US011998491B1

(12) United States Patent
Root

(10) Patent No.: US 11,998,491 B1
(45) Date of Patent: Jun. 4, 2024

(54) CREMATION REMAINS STORAGE SYSTEM

(71) Applicant: Allison K. Root, Elyria, OH (US)

(72) Inventor: Allison K. Root, Elyria, OH (US)

( * ) Notice: Subject to any disclaimer, the term of this patent is extended or adjusted under 35 U.S.C. 154(b) by 121 days.

(21) Appl. No.: 17/847,280

(22) Filed: Jun. 23, 2022

(51) Int. Cl.
*A61G 17/007* (2006.01)
*A61G 17/08* (2006.01)
*E04H 13/00* (2006.01)

(52) U.S. Cl.
CPC ........... *A61G 17/007* (2013.01); *A61G 17/08* (2013.01); *E04H 13/001* (2013.01); *E04H 13/008* (2013.01); *A61G 2203/90* (2013.01)

(58) Field of Classification Search
CPC .. A61G 17/007; A61G 17/08; A61G 2203/90; E04H 13/001; E04H 13/008; B65D 33/28; A01G 9/02; A01G 9/0291
USPC .................................... 27/1; 383/72; 47/66.6
See application file for complete search history.

(56) References Cited

U.S. PATENT DOCUMENTS 4,977,652 A * 12/1990 Graham ................ E04H 13/006 27/35
5,092,681 A * 3/1992 Ashley, III ............ B65F 1/0006 383/4
5,282,439 A * 2/1994 Oaks .................... A01K 1/0353 119/496
5,636,418 A 6/1997 Vail, III et al.
5,701,642 A * 12/1997 Order ...................... E04H 13/00 27/2
5,774,958 A * 7/1998 Casimir ............... A61G 17/007 27/1
5,799,488 A 9/1998 Truong
5,815,897 A * 10/1998 Longstreth ............ E04H 13/003 47/79
6,574,840 B1 * 6/2003 Doppel .................. A61G 17/06 27/19
7,636,991 B1 * 12/2009 Scalisi, III .............. E04H 13/00 27/35
7,665,195 B1 2/2010 Vazquez-Perez
8,074,329 B2 12/2011 Roberts
8,087,132 B2 * 1/2012 Forrest ................... A61G 17/08 27/1
9,756,775 B2 9/2017 Bibaud et al.
9,872,441 B1 * 1/2018 Lieberstein ........... E04H 13/008
9,883,981 B1 2/2018 Lu
10,052,251 B1 8/2018 Lu et al.
10,123,926 B2 * 11/2018 Brewer .............. A61G 17/0073
10,376,435 B2 8/2019 Brewer
10,813,819 B2 * 10/2020 Lieberstein ............ A61G 17/08
11,622,902 B2 * 4/2023 Laranjeira ............ A61G 17/007 27/3
11,779,502 B2 * 10/2023 Bisson ................. A61G 17/007 27/1
2006/0204149 A1 * 9/2006 Guerra ................... B65D 33/28 383/72
2008/0141508 A1 6/2008 Silva
2009/0020488 A1 * 1/2009 Turkel ............... A61G 17/0136 211/85.27

(Continued)

*Primary Examiner* — William L Miller
(74) *Attorney, Agent, or Firm* — Cramer Patent & Design PLLC; Aaron R. Cramer

(57) ABSTRACT

A cremation remains storage system is a container composed of biodegradable material the interior environment of which contains a water soluble natural fiber bag, coco coir netted seed starter pellet, a tree seed and woodchip disk. The device enables a user to bury cremains in an environmentally friendly container while simultaneously planting a tree.

13 Claims, 3 Drawing Sheets

(56) References Cited

U.S. PATENT DOCUMENTS

| | | | | |
|---|---|---|---|---|
| 2011/0005048 | A1* | 1/2011 | Davis | A61G 17/08 27/1 |
| 2011/0191993 | A1* | 8/2011 | Forrest | A61G 17/007 27/1 |
| 2019/0209410 | A1* | 7/2019 | Lieberstein | A01G 22/67 |
| 2019/0216668 | A1* | 7/2019 | Zakar | A61G 17/08 |
| 2023/0149242 | A1* | 5/2023 | Davis | A61G 17/0073 27/1 |

* cited by examiner

CREMATION REMAINS STORAGE SYSTEM

RELATED APPLICATIONS

Non-applicable.

FIELD OF THE INVENTION

The present invention relates generally to a cremation remains storage system.

BACKGROUND OF THE INVENTION

The reality of death is something we all must face. While various rituals, practices and methods of internment are used, many rely on the use of cremation. This process produces ashes of the deceased that many keep in urns. Others may spread the ashes over wilderness areas or even dispose of them at sea. Yet others may dispose of the cremains in a more localized area by planting them with seedlings for a tree or other plant thereby forming a memorial.

However, human cremains are not suitable for direct usage due to pH level imbalances. Additionally, there also be a need to hold the cremains temporarily, such as during winter months, until they can be planted with the tree or plant. Accordingly, there exists a need for a means by which cremains can be easily used when planting a memorial tree or plant without the disadvantages or restrictions as described above. The development of the cremation remains storage system will serve to address these needs.

SUMMARY OF THE INVENTION

To achieve the above and other objectives, the present invention provides for a cremation remains storage system which has a box which has a plurality of walls defining a cavity, a removable liner, and a lid. The lid is disposed on top of the box adapted to contain a plurality of deceased persons remains placed within the removable liner. The removable liner may include a drawstring closure to pull a plurality of edges of the removable liner together. The removable liner together may form a satchel from the drawstring closure. The removable liner together may form a pouch from the drawstring closure.

The drawstring closure may be made of a hemp material. The box may include a shape selected from the group consisting of an oval shape, an oblong shape, a triangular shape, a rectangular shape, a square shape, a polygonal shape, an irregular shape, a uniform shape, a non-uniform shape, a variable shape, or a tapered shape. The liner may be made of a biomaterial material. The liner may be made of a water soluble material.

The removable liner may be coupled to a box with a fastener selected from the group consisting of a plurality of clips, a plurality of hooks, a plurality of knots, a plurality of hook-and-loop-types, a plurality of integral connections, a plurality of friction fits, a plurality of pressure fits, a plurality of mating engagements, a plurality of dovetail connections, a plurality of tongue in groove connections, a plurality of threads, a plurality of clamps, or a plurality of keys and corresponding key slots. The box me be a cremation remains burial kit that includes a netted seed starter pellet, a woodchip disc portion, and a fertilizer portion. The netted seed starter pellet may be adapted to grow a plant or a tree in memory of a deceased person.

The netted seed starter pellet may facilitate growth of foliage. The portion may include a pH balance configured to fertilize a ground surface to facilitate growth of the plant or the tree. The netted seed starter pellet may include a coir netted seed starter having a 50% perlite mixture with aerating compost qualities. The woodchip disc portion may include a biodegradable adhesive that adheres to the fertilizer portion. The box may be utilized as a headstone. The netted seed starter pellet may be planted adjacent to the box utilized as the headstone. The deceased persons remains may be a plurality of cremation ashes. The removable liner may be placed into the box to bury the deceased persons remains.

The cremation remains storage system may be biodegradable.

BRIEF DESCRIPTION OF THE DRAWINGS

These and other features, aspects, and advantages of the present disclosure will become better understood with regard to the following description, appended claims, and accompanying drawings where:

DESCRIPTIVE KEY

Figure 6:
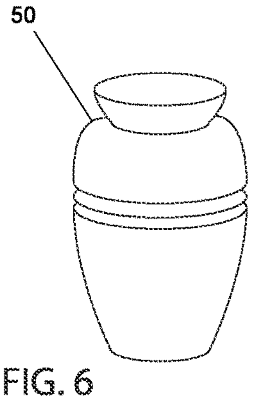
FIG. 6 is a perspective view of an urn 50 of the cremation remains storage system, according to an embodiment of this disclosure.

10 cremation remains storage system
12 box
14 walls
16 cavity
18 lid
20 liner
22 drawstring
30 pellet
32 disc portion
34 fertilizer portion
50 urn
R cremation remains

DETAILED DESCRIPTION

The following disclosure is provided to describe various embodiments of a biodegradable cremation remains storage system 10. The system 10 includes a box 12 having a removable liner 20, preferably with a drawstring closure 22. In some embodiments, the box 12 is provide as a kit that includes a netted seed starter pellet 30, a woodchip disc portion 32, and fertilizer portion 34.

Skilled artisans will appreciate additional embodiments and uses of the present invention that extend beyond the examples of this disclosure. Terms included by any claim that may be presented in any yet-to-be-filed non-provisional patent application are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one (1) of A, B, and C" should be read to permit any of A, B, or C singularly or in combination with the remaining elements. Additionally, such groups may include multiple instances of one (1) or more element in that group, which may be included with other elements of the group. All numbers, measurements, and values are given as approximations unless expressly stated otherwise.

Various aspects of the present disclosure will now be described in detail, without limitation. Skilled readers should not view the inclusion of any alternative labels as limiting in any way. Referring now to FIGS. 1-7, an illustrative biodegradable cremation remains storage system 10 will now be discussed in more detail.

Figure 1:
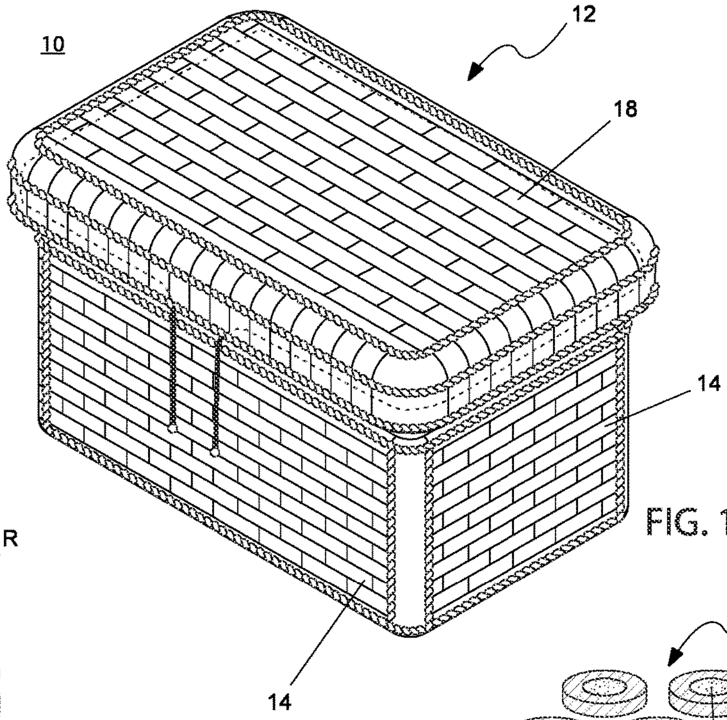
FIG. 1 is a perspective view of a box of a cremation remains storage system, according to an embodiment of this disclosure.
Figure 2:
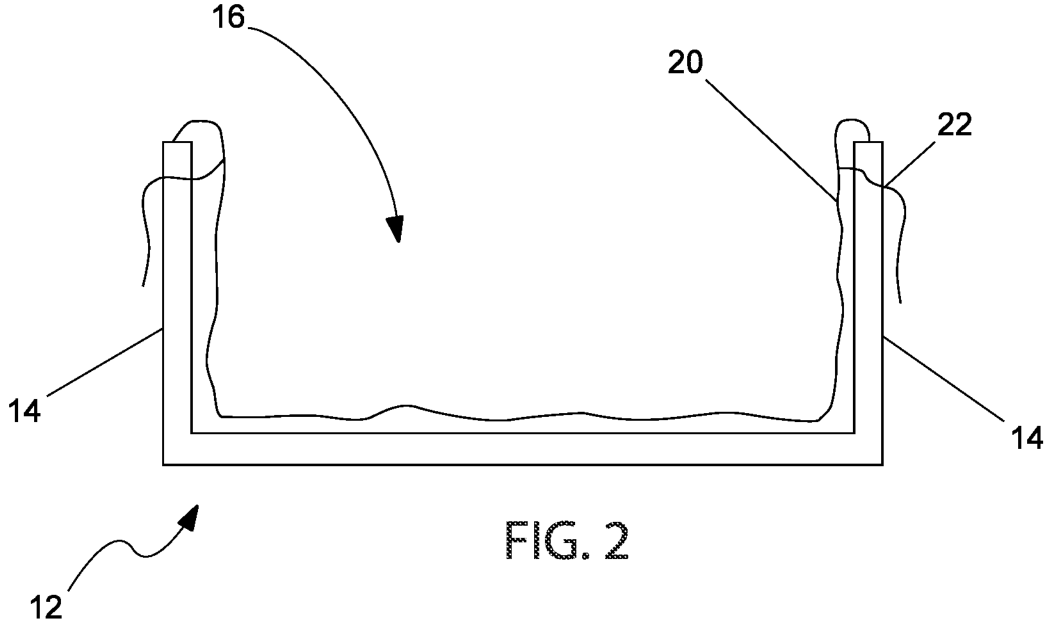
FIG. 2 is a side cut-away view of a liner of the cremation remains storage system, according to an embodiment of this disclosure.

Cremation remains storage system 10 includes a box 12, as shown in FIG. 1. Box 12 includes walls 14 defining a cavity 16, as shown in FIG. 2. In some embodiments, box 12 may include various shapes, for example, oval, oblong, triangular, rectangular, square, polygonal, irregular, uniform, non-uniform, variable, and/or tapered. Box 12 includes a lid 18 configured to contain the remains and/or items placed within box 12, as shown in FIG. 1. Box 12 includes a liner 20, as shown in FIG. 2. In some embodiments, liner includes a biodegradable material. In some embodiments, liner 20 is water soluble. In some embodiments, liner 20 may be attachable with box 12 via clips, hooks, knots, hook-and-loop-type, integral connection, friction fit, pressure fit, mating engagement, dovetail connection, tongue in groove, threaded, clamp, and/or key/keyslot.

Figure 3:
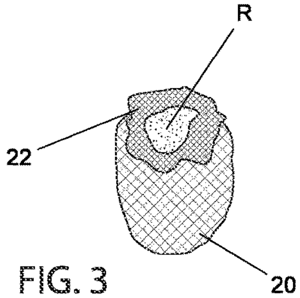
FIG. 3 is a perspective view of the liner of the cremation remains storage system, according to an embodiment of this disclosure.
Figure 4:
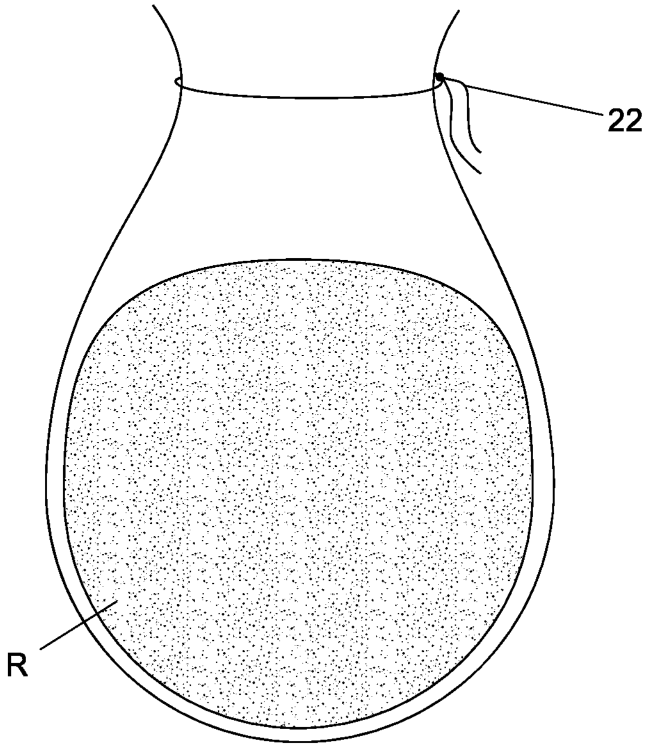
FIG. 4 is a side cut-away view of the box of the cremation remains storage system, according to an embodiment of this disclosure.

Liner 20 includes a drawstring 22 configured to pull edges of liner 20 together, as shown in FIG. 3. In some embodiments, drawstring 22 includes a hemp material. Liner 20 is configured to be removed from box 12 and the cremation remains are placed in liner 20 and drawstring 22 is utilized to close liner 20 about the remains to form a satchel, as shown in FIG. 4.

Figure 5:
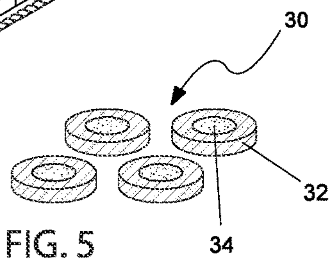
FIG. 5 is a perspective view of a plurality of pellets of the cremation remains storage system 10, according to an embodiment of this disclosure.

In some embodiments, box 12 includes a cremation remains burial kit. For example, in some embodiments, box 12 includes a seed starter pellet 30 for the user to utilize to grow a plant or tree in memory of the deceased, as shown in FIG. 5. Pellet 30 includes a disc portion 32 containing, for example, a wood chip material. In some embodiments, pellet 30 includes a coir netted seed starter having aerating compost qualities, for example, a fifty percent (50%) perlite mixture. Pellet 30 includes a fertilizer portion 34 having a pH balance configured to fertilize the ground to facilitate the growth of the plant or tree in memory of the deceased. In some embodiments, disc portion 32 includes a biodegradable adhesive configured to adhere the fertilizer thereto. Pellet 30 can be a starter for various types of foliage.

Figure 7:
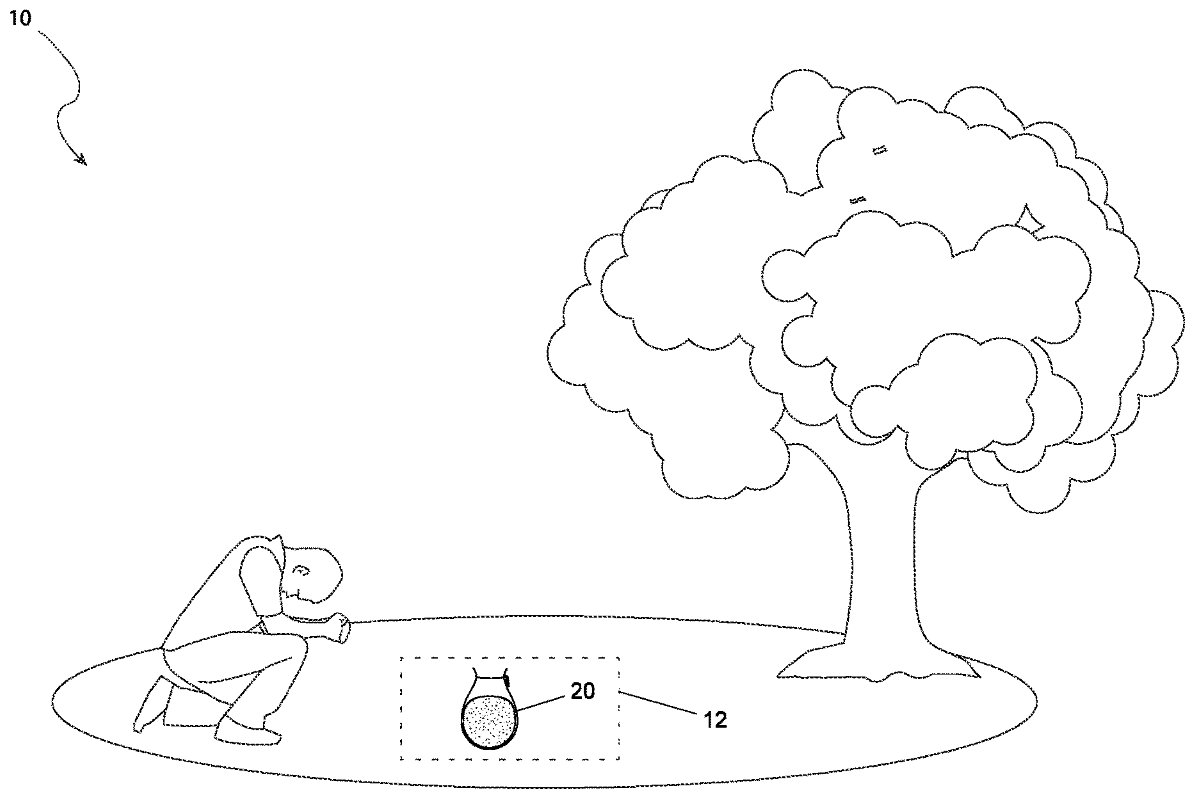
FIG. 7 is an environmental view of a cremation remains storage system, in use according to an embodiment of this disclosure.

In operation, the user has received a container or an urn 50 containing cremation remains R, as shown in FIG. 6. The user can pour remains R into liner 20. Drawstring 22 is actuated by pulling each end to enclose the remains within liner 20 forming a satchel or pouch. Liner 20, containing remains R, can be placed back into box 12 for burial, as shown in FIG. 7. In some embodiments, box 12 can be used as a headstone above the burial of the remains within the ground. Pellet 30 can be planted adjacent box 12 in memory of the deceased. Pellet 30 facilitates growth of foliage, for example, a tree, as shown in FIG. 7.

While various aspects of the present invention have been described in the above disclosure, the description of this disclosure is intended to illustrate and not limit the scope of the invention. The invention is defined by the scope of the claims of a corresponding nonprovisional utility patent application and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims of a corresponding nonprovisional utility patent application.

What is claimed is:

1. A cremation remains storage system, comprising:

a box having a plurality of walls defining a cavity, a removable liner, and a lid, the lid is disposed on top of the box adapted to contain a plurality of deceased persons cremation remains placed within the removable liner and, wherein the box is a cremation remains burial kit that includes a netted seed starter pellet, a woodchip disc portion, and a fertilizer portion;

wherein the netted seed starter pellet is adapted to grow a plant or a tree in memory of a deceased person;

wherein the netted seed starter pellet facilitates growth of foliage;

wherein the fertilizer portion includes a pH balance configured to fertilize a ground surface to facilitate growth of the plant or the tree;

wherein the netted seed starter pellet includes a coir netted seed starter having a 50% perlite mixture with aerating compost qualities; and, wherein the woodchip disc portion includes a biodegradable adhesive that adheres to the fertilizer portion.

2. The cremation remains storage system, according to claim 1, wherein the removable liner includes a drawstring closure to pull a plurality of edges of the removable liner together.

3. The cremation remains storage system, according to claim 2, wherein the removable liner together forms a satchel from the drawstring closure.

4. The cremation remains storage system, according to claim 2, wherein the removable liner together forms a pouch from the drawstring closure.

5. The cremation remains storage system, according to claim 2, wherein the drawstring closure is made of a hemp material.

6. The cremation remains storage system, according to claim 1, wherein the box includes a shape selected from the group consisting of: an oval shape, an oblong shape, a triangular shape, a rectangular shape, a square shape, a polygonal shape, an irregular shape, a uniform shape, a non-uniform shape, a variable shape, and a tapered shape.

7. The cremation remains storage system, according to claim 1, wherein the liner is made of a biomaterial material.

8. The cremation remains storage system, according to claim 1, wherein the liner is made of a water soluble material.

9. The cremation remains storage system, according to claim 1, wherein the removable liner is coupled to the box with a fastener selected from the group consisting of: a plurality of clips, a plurality of hooks, a plurality of knots, a plurality of hook-and-loop-types, a plurality of integral connections, a plurality of friction fits, a plurality of pressure fits, a plurality of mating engagements, a plurality of dovetail connections, a plurality of tongue in groove connections, a plurality of threads, a plurality of clamps, and a plurality of keys and corresponding key slots.

10. The cremation remains storage system, according to claim 1, wherein the box is utilized as a headstone.

11. The cremation remains storage system, according to claim 10, wherein the netted seed starter pellet is planted adjacent to the box utilized as the headstone.

12. The cremation remains storage system, according to claim 1, wherein the removable liner is placed into the box to bury the deceased persons cremation remains.

13. The cremation remains storage system, according to claim 1, wherein the cremation remains storage system is biodegradable.

* * * * *